United States Patent
Park et al.

(10) Patent No.: US 11,011,917 B2
(45) Date of Patent: May 18, 2021

(54) WIRELESS BATTERY MANAGEMENT APPARATUS AND BATTERY PACK INCLUDING SAME

(71) Applicant: LG CHEM, LTD., Seoul (KR)

(72) Inventors: Chan-Ha Park, Daejeon (KR); Sang-Hoon Lee, Daejeon (KR); Yean-Sik Choi, Daejeon (KR)

(73) Assignee: LG Chem, Ltd., Seoul (KR)

( * ) Notice: Subject to any disclaimer, the term of this patent is extended or adjusted under 35 U.S.C. 154(b) by 13 days.

(21) Appl. No.: 16/497,667

(22) PCT Filed: Sep. 13, 2018

(86) PCT No.: PCT/KR2018/010777
§ 371 (c)(1),
(2) Date: Sep. 25, 2019

(87) PCT Pub. No.: WO2019/074217
PCT Pub. Date: Apr. 18, 2019

(65) Prior Publication Data
US 2020/0036194 A1    Jan. 30, 2020

(30) Foreign Application Priority Data

Oct. 10, 2017   (KR) .................. 10-2017-0129138

(51) Int. Cl.
*H02J 7/00*     (2006.01)
*H01M 10/42*    (2006.01)

(52) U.S. Cl.
CPC ....... *H02J 7/0013* (2013.01); *H01M 10/4257* (2013.01); *H01M 2010/4271* (2013.01)

(58) Field of Classification Search
CPC .. H02J 7/0013; H02J 7/0047; H01M 10/4257; H01M 2010/4271;
(Continued)

(56) References Cited

U.S. PATENT DOCUMENTS 8,933,671 B2 *  1/2015  Lee ..................... H01M 10/441
                                                          320/135
9,553,460 B2 *  1/2017  Dao ....................... H02J 7/0013
(Continued)

FOREIGN PATENT DOCUMENTS

EP    2 725 686 A      4/2014
JP    2010-146991 A    7/2010
(Continued)

OTHER PUBLICATIONS

International Search Report dated Dec. 19, 2018, issued in corresponding International Patent Application No. PCT/KR2018/010777.
(Continued)

*Primary Examiner* — M Baye Diao
(74) *Attorney, Agent, or Firm* — Morgan, Lewis & Bockius LLP

(57) ABSTRACT

Disclosed is a wireless battery management system and a battery pack including the same. The wireless battery management system may be operably coupled to a top-level controller, and includes a master BMS and a plurality of slave BMSs. The master BMS is configured to allocate different identification information to the plurality of slave BMSs using a wireless signal according to an identification information allocation command from the top-level controller. Each slave BMS may be configured to set its wireless address and regular ID by receiving the wireless signal when waking up by the top-level controller according to a predefined rule.

12 Claims, 5 Drawing Sheets

(58) Field of Classification Search
CPC ........... H01M 2220/20; H01M 10/482; H01M 2010/4278; H01M 10/425; Y02E 60/10; Y02T 10/70
USPC .......................................................... 320/128
See application file for complete search history.

(56) References Cited

U.S. PATENT DOCUMENTS

| | | | |
|---|---|---|---|
| 9,559,530 B2* | 1/2017 | Lee | H02J 13/0003 |
| 10,571,523 B2* | 2/2020 | Kim | H02J 7/00 |
| 2010/0019732 A1 | 1/2010 | Utsumi et al. | |
| 2011/0175574 A1 | 7/2011 | Sim et al. | |
| 2012/0268069 A1 | 10/2012 | Park et al. | |
| 2013/0271072 A1 | 10/2013 | Lee et al. | |
| 2014/0035365 A1 | 2/2014 | Yoo | |
| 2014/0079963 A1 | 3/2014 | Takeuchi et al. | |
| 2014/0091769 A1 | 4/2014 | Kim et al. | |
| 2014/0091770 A1 | 4/2014 | Lee et al. | |
| 2014/0300364 A1* | 10/2014 | Choi | G01R 31/385 324/426 |
| 2014/0347014 A1 | 11/2014 | Lee et al. | |
| 2014/0354291 A1 | 12/2014 | Kikuchi et al. | |
| 2014/0365792 A1 | 12/2014 | Yun | |
| 2015/0188334 A1* | 7/2015 | Dao | H04Q 9/00 320/107 |
| 2016/0301112 A1 | 10/2016 | Yamazoe et al. | |
| 2017/0222275 A1 | 8/2017 | Krishnan et al. | |
| 2018/0149704 A1 | 5/2018 | Yoon et al. | |
| 2019/0237816 A1* | 8/2019 | Kim | B60L 58/12 |
| 2019/0260097 A1* | 8/2019 | Kwon | H01M 10/482 |
| 2019/0265304 A1* | 8/2019 | Kim | B60L 50/50 |

FOREIGN PATENT DOCUMENTS

| | | |
|---|---|---|
| JP | WO2013/051157 A1 | 4/2013 |
| JP | 2014-197345 A | 10/2014 |
| JP | 2014-239639 A | 12/2014 |
| JP | 5856934 B2 | 12/2015 |
| JP | 2019-511077 A | 4/2019 |
| KR | 10-2011-0013747 A | 2/2011 |
| KR | 10-2014-0015273 A | 2/2014 |
| KR | 10-1386080 B1 | 4/2014 |
| KR | 10-2014-0073949 A | 6/2014 |
| KR | 10-2014-0078323 A | 6/2014 |
| KR | 10-1631064 B1 | 6/2016 |
| KR | 10-2017-0051071 A | 5/2017 |
| KR | 10-2017-0062757 A | 6/2017 |
| WO | 2017/105046 A | 6/2017 |

OTHER PUBLICATIONS

Office Action dated Aug. 19, 2020, issued in corresponding Korean Patent Application No. 10-2017-0129138.
Office Action dated Sep. 21, 2020, issued in corresponding European Patent Application No. 18865769.6.
Office Action dated Oct. 27, 2020, issued in corresponding Japanese Patent Application No. 2019-549511.

* cited by examiner

WIRELESS BATTERY MANAGEMENT APPARATUS AND BATTERY PACK INCLUDING SAME

TECHNICAL FIELD

The present disclosure relates to a wireless battery management apparatus that allocates different identification information to a plurality of slave battery management systems (BMSs) using a wireless signal from a master BMS and establishes a wireless connection for encrypted communication between the master BMS and the plurality of slave BMSs and a battery pack including the same.

The present application claims priority to Korean Patent Application No. 10-2017-0129138 filed in the Republic of Korea on Oct. 10, 2017, the disclosures of which are incorporated herein by reference.

BACKGROUND ART

Recently, there is dramatically growing demand for portable electronic products such as laptop computers, video cameras and mobile phones, and with the extensive development of electric vehicles, accumulators for energy storage, robots and satellites, many studies are being made on high performance secondary batteries that can be recharged repeatedly.

Currently, commercially available secondary batteries include nickel-cadmium batteries, nickel-hydrogen batteries, nickel-zinc batteries, lithium secondary batteries and the like, and among them, lithium secondary batteries have little or no memory effect, and thus they are gaining more attention than nickel-based secondary batteries for their advantages of free charging and discharging, a very low self-discharge rate and high energy density.

A battery pack applied to electric vehicles generally includes a plurality of battery modules connected in series and/or in parallel and a plurality of slave battery management systems (BMSs). Each slave BMS monitors and controls the state of the battery module that each slave BMS is designated to manage. Recently, to meet the demand for high-capacity high-output battery packs, the number of battery modules included in a battery pack also increases. To efficiently manage each battery module included in the battery pack, a battery management apparatus having a multi slave structure is disclosed. The multi slave structure includes a plurality of slave BMSs installed in each battery module and a master BMS to control the overall operation of the plurality of slave BMSs.

In the battery pack having the multi slave structure, for the master BMS to individually collect state information of the plurality of battery modules from each of the plurality of slave BMSs, and transmit a control command for the plurality of battery modules to the plurality of slave BMSs, each slave BMS should be allocated with an ID indicating the physical or electrical location of the battery module that each slave BMS manages.

Patent Literature 1 discloses allocating IDs to a plurality of slave BMSs in a sequential order. Patent Literature 1 proposes a method for allocating IDs by a master BMS wiredly connected to each slave BMS. However, the ID allocation method according to Patent Literature 1 is performed on the premise of wired connection between the master BMS and each slave BMS, so there is a risk of wire disconnection and a great spatial limitation. Additionally, to set IDs in an order of the physical location (in terms of hardware) of each slave BMS, it is essential to measure a potential difference by batteries that are managed by each slave BMS in advance.

Additionally, there may be methods in which the master BMS allocates identification information to the plurality of slave BMSs in a wireless manner. To allocate identification information in a wireless manner, the master BMS needs to check each slave BMS is electrically connected to which of the plurality of battery modules included in the battery pack beforehand. However, even though each slave BMS wirelessly transmits module information (e.g., potential) of the battery module connected to it to the master BMS, the master BMS has a difficulty in determining which of the plurality of slave BMSs has transmitted the module information.

Meanwhile, when the battery pack including the battery system gone through identification information allocation is mounted in an electric powered apparatus such as an electric vehicle, the master BMS needs to collect module information from each of the plurality of slave BMSs, and report the collected module information to the electric powered apparatus within a predetermined required time (e.g., 2 sec) from the point in time in which the electric powered apparatus switches from the sleep state (e.g., key off) to the operating state (e.g., key on). However, it is not that it takes a short time (e.g., 1 sec) for each BMS (e.g., the master BMS) to recognize another (e.g., the salve BMS) present in a wireless network, determine if the recognized BMS is a reliable device, and establish a wireless connection through a security process for encrypted communication therebetween according to the determination result. Accordingly, the larger number of slave BMSs included in the battery management apparatus, the longer the time taken for the master BMS to establish a wireless connection with all slave BMSs.

(Patent Literature 1) Korean Patent Publication No. 10-2011-0013747 (published Feb. 10, 2011)

DISCLOSURE

Technical Problem

The present disclosure is designed to solve the above-described problem, and therefore, the present disclosure is directed to providing a battery management system that allocates different identification information to a plurality of slave BMSs using a wireless signal without the process of checking the physical or electrical location of the plurality of slave BMSs and a battery pack including the same.

Additionally, the present disclosure is aimed at reducing the time taken to establish a wireless connection for encrypted communication between the master BMS and the plurality of slave BMSs.

These and other objects and advantages of the present disclosure will be understood by the following description and will be apparent from the embodiments of the present disclosure. Further, it will be readily understood that the objects and advantages of the present disclosure are realized by the means set forth in the appended claims and combinations thereof.

Technical Solution

Various embodiments of the present disclosure for achieving the above-described object are as follows. A wireless battery management apparatus according to an aspect of the present disclosure is operably coupled to a top-level controller. The wireless battery management apparatus includes a master battery management system (BMS) which is operably coupled to the top-level controller by a wired communication mode, and a plurality of slave BMSs which is operably coupled to the master BMS by a wireless communication mode. The top-level controller is configured to transmit an identification information allocation command including a plurality of different slave identification information to the master BMS, and supply operating power to the plurality of slave BMSs in a sequential order according to a predefined rule. The master BMS wirelessly is configured to transmit any one slave identification information corresponding to the predefined rule among the plurality of slave identification information to a slave BMS currently in wakeup state by the operating power when operating in an identification information allocation mode in response to the identification information allocation command. Each slave BMS is configured to establish a wireless connection for unencrypted communication with the master BMS using its pre-allocated temporary address when waking up by the operating power, and set its wireless address and regular ID using the slave identification information transmitted from the master BMS through the unencrypted communication.

Each slave identification information may include slave address data and a regular ID for each slave BMS. In this case, the regular ID of each slave identification information may indicate an electrical location of a battery module to which each slave BMS is coupled among a plurality of battery modules connected in series in a battery pack.

The identification information allocation command may further include master identification information for the master BMS. The master BMS may be further configured to transmit the master identification information to the slave BMS currently in wakeup state by the operating power. Each slave BMS may be further configured to store the master identification information in its slave memory while each slave BMS is in wakeup state by the operating power.

Each time the master BMS transmits the slave identification information to each slave BMS, the master BMS may be further configured to transmit a setting completion message to the top-level controller. In this case, the top-level controller may be further configured to stop supplying the operating power to the slave BMS currently in wakeup state, when the top-level controller receives the completion message from the master BMS. The top-level controller may be further configured to supply the operating power to a next slave BMS according to the predefined rule, when the top-level controller stops supplying the operating power to the slave BMS currently in wakeup state.

The master BMS may be further configured to generate a security key for each slave BMS each time the master BMS transmits the slave identification information to each slave BMS. The master BMS may be further configured to map the security key generated for each slave BMS onto the slave identification information of each slave BMS and register the security key mapped onto the slave identification information in a device database of the master BMS.

The top-level controller may be further configured to transmit a wakeup command to the master BMS when a predefined event occurs after the identification information allocation mode ends. The master BMS may be further configured to update a connected device list using the slave identification information of the plurality of slave BMSs registered in the device database when receiving the wakeup command. The master BMS may be further configured to establish a wireless connection for encrypted communication with each slave BMS using the updated connected device list. The predefined event may be an event of ignition ON of an electric powered apparatus in which the wireless battery management apparatus is mounted.

A battery pack according to another aspect of the present disclosure may include the wireless battery management apparatus.

Advantageous Effects

According to at least one of the embodiments of the present disclosure, it is possible to allocate different identification information to a plurality of slave battery management systems (BMSs) using a wireless signal without the process of checking the physical or electrical location of the plurality of slave BMSs before the manufacture of a battery pack is finished.

According to at least one of the embodiments of the present disclosure, it is possible to reduce the time taken to establish a wireless connection for encrypted communication between the master BMS and the plurality of slave BMSs after the manufacture of the battery pack is finished.

The effects of the present disclosure are not limited to the above-mentioned effects, and other effects not mentioned herein will be clearly understood by those skilled in the art from the appended claims.

BRIEF DESCRIPTION OF THE DRAWINGS

The accompanying drawings illustrate a preferred embodiment of the present disclosure, and together with the detailed description of the present disclosure described below, serve to provide a further understanding of the technical aspects of the present disclosure, and thus the present disclosure should not be construed as being limited to the drawings.

MODE FOR CARRYING OUT THE INVENTION

Figure 1:
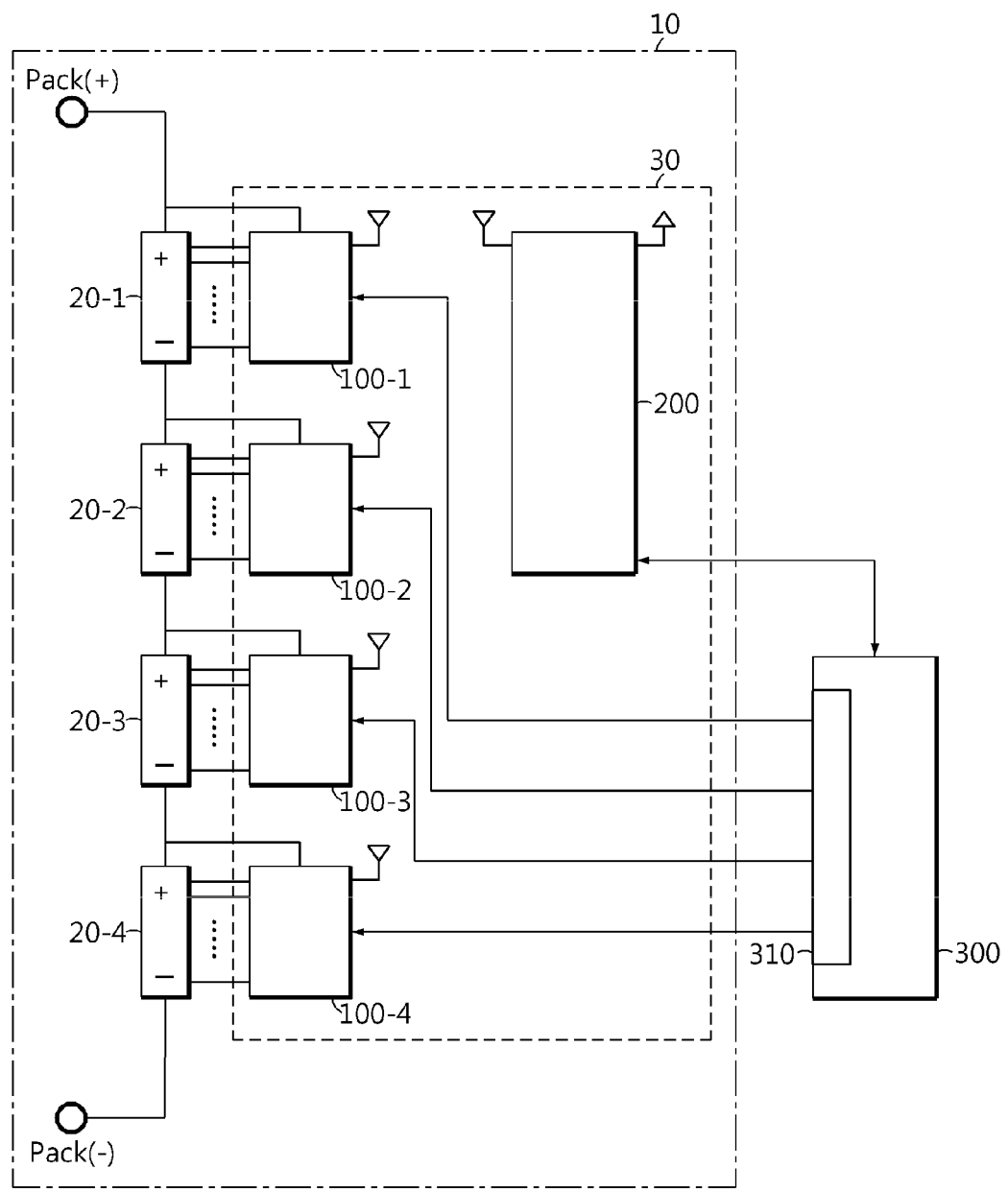
FIG. 1 is a schematic diagram showing the configuration of a wireless battery management apparatus according to an embodiment of the present disclosure and a battery pack including the same.

Hereinafter, preferred embodiments of the present disclosure will be described in detail with reference to the accompanying drawings. Prior to the description, it should be understood that the terms or words used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the embodiments described herein and illustrations shown in the drawings are just a most preferred embodiment of the present disclosure, but not intended to fully describe the technical aspects of the present disclosure, so it should be understood that a variety of other equivalents and variations could be made thereto at the time of filing the application.

Additionally, in describing the present disclosure, when it is deemed that a detailed description of relevant known elements or functions renders the key subject matter of the present disclosure ambiguous, the detailed description is omitted herein.

The terms including the ordinal number such as "first", "second" and the like, may be used to distinguish one element from another among various elements, but not intended to limit the elements by the terms.

Unless the context clearly indicates otherwise, it will be understood that the term "comprises" or "includes" when used in this specification, specifies the presence of stated elements, but does not preclude the presence or addition of one or more other elements. Additionally, the term <control unit> as used herein refers to a processing unit of at least one function or operation, and this may be implemented by hardware or software alone or in combination.

In addition, throughout the specification, it will be further understood that when an element is referred to as being "connected to" another element, it can be directly connected to the other element or intervening elements may be present.

FIG. 1 is a schematic diagram showing the configuration of a wireless battery management apparatus 30 according to an embodiment of the present disclosure and a battery pack 10 including the same.

Referring to FIG. 1, the battery pack 10 may be mounted in a variety of electric powered apparatuses such as electric vehicles using electrical energy stored in the battery pack 10. The battery pack 10 includes a plurality of battery modules 20-1~20-4 connected in series and the wireless battery management apparatus 30. Each battery module 20 may include a plurality of battery cells electrically connected in series and/or in parallel. The wireless battery management apparatus 30 includes a master battery management system (BMS) 200 and a plurality of slave BMSs 100-1~1004. The master BMS 200 of the wireless battery management apparatus 30 may allocate different identification information to the plurality of slave BMSs 100-1~100-4 by interworking with a top-level controller 300. The wireless battery management apparatus 30 may further include top-level controller 300.

Hereinafter, for convenience of description, as shown in FIG. 1, assume that the battery pack 10 includes four battery modules 20-1~20-4, and the wireless battery management apparatus 30 includes four slave BMSs 100-1~100-4.

The plurality of slave BMSs 100-1~100-4 is installed such that the plurality of slave BMSs 100-1~100-4 matches the plurality of battery modules 20-1~20-4 included in the battery pack 10 one-to-one. Each of the plurality of slave BMSs 100-1~100-4 is electrically coupled to one of the battery modules 20-1~20-4 in which each of the slave BMSs 100-1~100-4 is installed among the plurality of battery modules 20-1~20-4. For example, the first slave BMS 100-1 is electrically coupled to the first battery module 20-1, the second slave BMS 100-2 is electrically coupled to the second battery module 20-2, the third slave BMS 100-3 is electrically coupled to the third battery module 20-3, and the fourth slave BMS 100-4 is electrically coupled to the fourth battery module 20-4.

Each slave BMS 100 detects the overall state (e.g., voltage, current, temperature) of the battery module 20 electrically connected to each slave BMS 100, and performs many control functions (e.g., charging, discharging, balancing) for adjusting the state of the battery module 20. In this instance, each control function may be performed directly by each slave BMS 100 based on the state of the battery module 20, or may be performed according to a command from the master BMS 200.

The master BMS 200 is operably coupled to the plurality of slave BMSs 100-1~100-4 in a wireless communication mode.

The top-level controller 300 is operably coupled to the master BMS 200 in a wired communication mode. The top-level controller 300 may be, for example, a PC provided in a process line of the battery pack 10 or an ECU provided in the electric vehicle. The top-level controller 300 may be operably coupled to each of the plurality of slave BMSs 100-1~100-4 in the wired communication mode. The top-level controller 300 includes a power control unit 310. The power control unit 310 may be electrically connectable to the plurality of slave BMSs 100-1~100-4 one-to-one through a plurality of power lines. The power control unit 310 is configured to supply the operating power to the plurality of slave BMSs 100-1~100-4 in a sequential order according to a predefined rule. For example, the power control unit 310 may directly supply the operating power to each slave BMS 100. As another example, the power control unit 310 may output a control signal for inducing each slave BMS 100 to be supplied with the operating power from one of the battery modules 20-1~20-4 connected thereto, rather than directly supplying the operating power. Each slave BMS 100 turns into wakeup state by the operating power from the power control unit 310 or the operating power from the battery module 20 connected thereto. That is, each slave BMS 100 may be kept in wakeup state while the operating power is being supplied, and may be kept in sleep state while there is no operating power supply.

Figure 2:
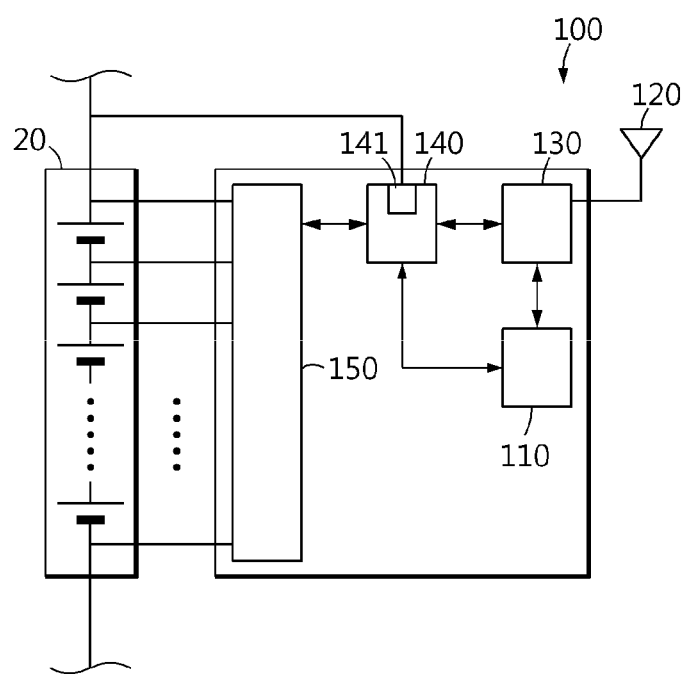
FIG. 2 is a schematic diagram showing the configuration of a slave battery management system (BMS) shown in FIG. 1.

FIG. 2 is a schematic diagram showing the configuration of the slave BMS 100 shown in FIG. 1.

Referring to FIG. 2, each of the plurality of slave BMSs 100-1~100-4 may include a slave memory 110, a slave antenna 120, a slave communication unit 130 and a slave control unit 140.

The slave memory 110 has a temporary address stored therein. The temporary address may be allocated before each slave BMS 100 is installed in the battery pack 10. The temporary address may be temporarily used for each slave BMS 100 to perform an unencrypted communication with the master BMS 200 in the wireless communication mode for a period of time until identification information as described below is allocated to each slave BMS 100.

Only when allocation of different identification information to all the slave BMSs 100-1~100-4 of the wireless battery management apparatus 30 is completed through the unencrypted communication, the master BMS 200 may individually manage the plurality of battery modules 20-1~20-4 by selectively controlling the plurality of slave BMSs 100-1~100-4. The unencrypted communication between the master BMS 200 and the plurality of slave BMSs 100-1~100-4 is preferably performed before the manufacture of the battery pack 10 is finished (e.g., before the battery pack is mounted in the electric powered apparatus).

The slave memory 110 is not limited to a particular type and includes any known information storage means capable of recording, erasing, updating and reading data. For example, the slave memory 110 may be DRAM, SDRAM, flash memory, ROM, EEPROM, and a register. The slave memory 110 may store program codes defining the processes that can be executed by the slave control unit 140.

The slave memory 110 may be physically separated from the slave control unit 140, and may be integrated into a chip with the slave control unit 140.

The slave antenna 120 and the slave communication unit 130 are operably connected to each other. The slave communication unit 130 includes a wireless circuit to demodulate a wireless signal received by the slave antenna 120. Additionally, the slave communication unit 130 may modulate a signal to transmit to the master BMS 200 through the slave antenna 120 and provide it to the slave antenna 120. The slave antenna 120 may transmit a wireless signal corresponding to the signal modulated by the slave communication unit 130 to the master BMS 200.

The slave control unit 140 includes at least one processor, and is operably connected to the slave memory 110 and the slave communication unit 130. The slave control unit 140 is configured to manage the overall operation of the slave BMS 100 including the slave control unit 140.

The slave control unit 140 may include a sensing unit 150 configured to detect the state of the battery module 20. For example, the sensing unit 150 may include at least one of a voltage measurement circuit to detect the voltage of the battery module 20, a current measurement circuit to detect the current of the battery module 20, and a temperature detection circuit to detect the temperature of the battery module 20.

The slave control unit 140 provides the slave communication unit 130 with sensing information indicating the state of the battery module 20 detected by the sensing unit 150. Accordingly, the slave communication unit 130 may transmit a wireless signal corresponding to the sensing information to the master BMS 200 using the slave antenna 120.

The slave control unit 140 may further include a power circuit 141. The power circuit 141 may generate at least one power voltage using the operating power supplied from the battery module 20 in which the slave BMS 100 is installed. The power voltage generated by the power circuit 141 may be supplied to the slave memory 110, the slave antenna 120 and the slave communication unit 130. Additionally, the power voltage generated by the power circuit 141 may be supplied to each processor included in the slave control unit 140.

The slave control unit 140 may transmit the temporary address stored in the slave memory 110 to the master BMS 200 by the wireless communication mode using the slave antenna 120 and the slave communication unit 130.

Each processor included in the slave control unit 140 may selectively include a processor, an application-specific integrated circuit (ASIC), chipsets, a logic circuit, a register, a communication modem and a data processing device known in the art to execute various control logics. At least one of the various control logics of the slave control unit 140 may be combined, and the combined control logics may be written in computer-readable coding system and recorded in computer-readable recording media. The recording media is not limited to a particular type and includes any type that can be accessed by a processor included in a computer. For example, the recording media includes at least one selected from the group consisting of ROM, RAM, a register, CD-ROM, a magnetic tape, a hard disk, a floppy disk and an optical data recording device. Additionally, the coding system may be modulated to a carrier signal and included in a communication carrier at a particular point in time, and may be stored and executed in computers connected via a network in distributed manner. Additionally, functional programs, codes and code segments for implementing the combined control logics may be readily inferred by programmers in the technical field to which the present disclosure belongs.

Figure 3:
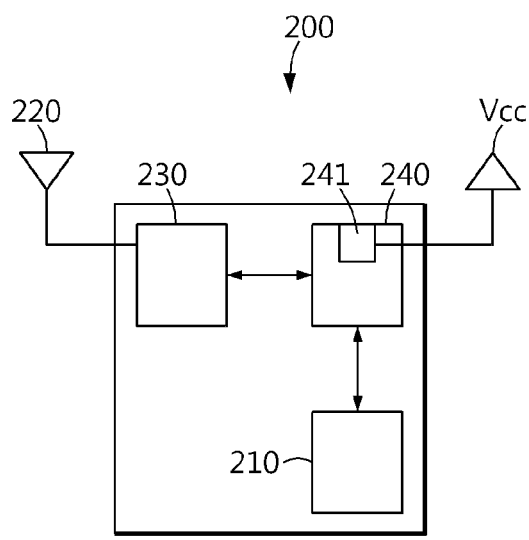
FIG. 3 is a schematic diagram showing the configuration of a master BMS shown in FIG. 1.

FIG. 3 is a schematic diagram showing the configuration of the master BMS 200 shown in FIG. 1.

Referring to FIG. 3, the master BMS 200 may include a master memory 210, a master antenna 220, a master communication unit 230 and a master control unit 240.

The master memory 210 is configured to eternally or temporarily store at least part of data transmitted from the top-level controller 300 by the wired communication mode or data transmitted from the plurality of slave BMSs 100-1~100-4 by the wireless communication mode. The master memory 210 is not limited to a particular type and includes any known information storage means capable of recording, erasing, updating and reading data. For example, the master memory 210 may be DRAM, SDRAM, flash memory, ROM, EEPROM, and a register. The master memory 210 may store program codes defining the processes that can be executed by the master control unit 240.

The master memory 210 may be physically separated from the master control unit 240, and may be integrated into a chip with the master control unit 240.

The master antenna 220 and the master communication unit 230 are operably connected to each other. The master communication unit 230 includes a wireless circuit to demodulate a wireless signal received by the master antenna 220. The master communication unit 230 may modulate a signal to transmit to the slave BMS 100, and wirelessly transmit the modulated signal using the master antenna 220. The master antenna 220 may selectively transmit a wireless signal corresponding to the signal modulated by the master communication unit 230 to at least one of the plurality of slave BMSs 100-1~100-4.

The master control unit 240 may further include a power circuit 241. The power circuit 241 of the master control unit 240 generates at least one power voltage using electrical energy supplied from the battery module 20, an external power supply Vcc, or its power supply. The power voltage generated by the power circuit 241 of the master control unit 240 may be supplied to the master memory 210, the master antenna 220 and the master communication unit 230. Additionally, the power voltage generated by the power circuit 241 of the master control unit 240 may be supplied to each processor included in the master control unit 240.

The master control unit 240 includes at least one processor, and is operably connected to the master memory 210 and the master communication unit 230. The master control unit 240 is configured to manage the overall operation of the master BMS 200. Additionally, the master control unit 240 may calculate a State Of Charge (SOC) and/or a State Of Health (SOH) of each of the battery modules 20-1~20-4 based on the wireless signal corresponding to the sensing information generated by each of the plurality of slave BMSs 100-1~100-4 among the wireless signals received by the master antenna 220. Additionally, the master control unit 240 may generate information for controlling the charging, discharging, and/or balancing of each of the battery modules 20-1~20-4 based on the calculated SOC and/or SOH, and wirelessly transmit it to at least one of the plurality of slave BMSs 100-1~100-4 through the master antenna 220 and the master communication unit 230.

Each processor included in the master control unit 240 may selectively include a processor, an application-specific integrated circuit (ASIC), chipsets, a logic circuit, a register, a communication modem and a data processing device known in the art to execute various control logics. At least one of the various control logics of the master control unit 240 may be combined, and the combined control logics may be written in computer-readable coding system and recorded in computer-readable recording media. The recording media is not limited to a particular type and includes any type that can be accessed by a processor included in a computer. For example, the recording media includes at least one selected from the group consisting of ROM, RAM, a register, CD-ROM, a magnetic tape, a hard disk, a floppy disk and an optical data recording device. Additionally, the coding system may be modulated to a carrier signal and included in a communication carrier at a particular point in time, and may be stored and executed in computers connected via a network in distributed manner. Additionally, functional programs, codes and code segments for implementing the combined control logics may be readily inferred by programmers in the technical field to which the present disclosure belongs.

Figure 4:
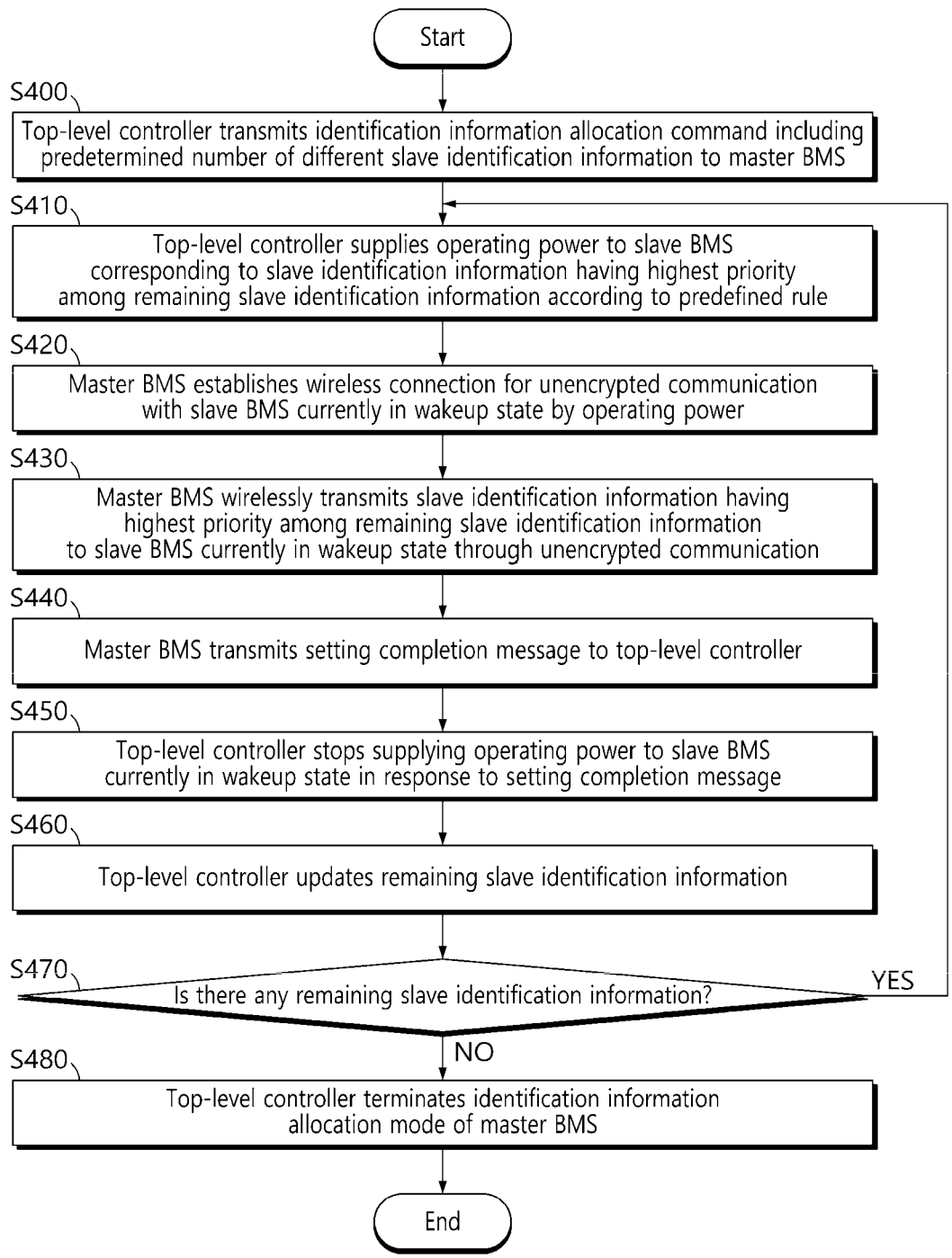
FIG. 4 is a flowchart illustrating a method of allocating different identification information to a plurality of slave BMSs by a wireless battery management apparatus according to an embodiment of the present disclosure.

FIG. 4 is a flowchart illustrating a method of allocating different slave identification information to the plurality of slave BMSs by the wireless battery management apparatus according to an embodiment of the present disclosure.

Referring to FIG. 4, in step S400, the top-level controller 300 transmits an identification information allocation command including a predetermined number of different slave identification information to the master BMS 200 connected by the wired communication mode. The number of slave identification information included in the identification information allocation command may be equal to the number of slave BMSs 100-1~100-4 included in the wireless battery management apparatus 30. The identification information allocation command may be a signal for inducing the master BMS 200 to operate in an identification information allocation mode in response to the identification information allocation command. The master BMS 200 may operate in the identification information allocation mode until the setting of slave identification information for all the slave BMSs 100-1~100-4 is completed. The identification information allocation command may further include data for setting priority between the predetermined number of slave identification information. Each slave identification information may include slave address data and a regular ID for each slave BMS 100.

The slave address data is for identifying the plurality of slave BMSs 100-1~100-4 in the wireless network. The regular ID is for indicating the electrical location of the battery module 20 to which each slave BMS 100 is coupled. For example, the electrical location of the slave BMS 100-1 coupled to the battery module 20-1 is different from the electrical location of the slave BMS 100-2 coupled to the battery module 20-2. The master BMS 200 may identify the electrical location of each slave BMS 100 using the regular ID. The identification information allocation command may further include master identification information. The master identification information is for the master BMS 200, and may include master address data of the master BMS 200. The master BMS 200 may set its wireless address based on the master address data of the master identification information.

In step S410, the top-level controller 300 supplies the operating power to one of the slave BMSs 100-1~100-4 corresponding to slave identification information having the highest priority among the remaining slave identification information according to the predefined rule. Here, the remaining slave identification information may be slave identification information not yet transmitted to one or more of the slave BMSs 100-1~100-4 among the predetermined number of slave identification information. For example, in a situation in which only the slave identification information for the slave BMS 100-1 is set, the remaining slave identification information may be slave identification information for each of the remaining slave BMSs 100-2~100-4. The priority may be determined according to the predefined rule. The slave BMS 100 corresponding to the slave identification information having the highest priority among the remaining slave identification information wakes up by the operating power supplied in step S410. Of course, the remaining slave BMSs 100 not supplied with the operating power by the top-level controller 300 are kept in sleep state.

In step S420, the master BMS 200 establishes a wireless connection for unencrypted communication with the slave BMS 100 currently in wakeup state by the operating power. This means that the slave BMS 100 currently in wakeup state also establishes a wireless connection for unencrypted communication with the master BMS 200 using its pre-allocated temporary address. The unencrypted communication refers to a method for transmission and reception of date between two or more wireless devices without using a security key.

In step S430, the master BMS 200 wirelessly transmits the slave identification information having the highest priority among the remaining slave identification information to the slave BMS 100 currently in wakeup state through the unencrypted communication. The slave BMS 100 currently in wakeup state may set its wireless address and regular ID using the slave identification information transmitted in step S430. The master BMS 200 may transmit the master identification information to the slave BMS 100 currently in wakeup state, and the slave BMS 100 currently in wakeup state may store the master identification information in its slave memory 110.

In step S440, the master BMS 200 transmits a setting completion message to the top-level controller 300. The setting completion message is for notifying the top-level controller 300 that transmission of the slave identification information having the highest priority among the remaining slave identification information to the slave BMS 100 currently in wakeup state is completed.

In step S450, the top-level controller 300 stops supplying the operating power to the slave BMS 100 currently in wakeup state in response to the setting completion message.

In step S460, the top-level controller 300 updates the remaining slave identification information. That is, the top-level controller 300 may rule out the slave identification information having the highest priority from the remaining slave identification information in step S410.

In step S470, the top-level controller 300 determines whether there is any remaining slave identification information. When different slave identification information has been already transmitted to all the slave BMSs 100-1~100-4, the top-level controller 300 determines that there is no remaining slave identification information. When the result in step S470 is "YES", the method returns to S410. On the contrary, when the result in step S470 is "NO", the top-level controller 300 terminates the identification information allocation mode of the master BMS 200 in step S480, then the method ends.

Meanwhile, each time step S430 is performed, a security process may be executed between the master BMS 200 and each slave BMS 100. By the execution of the security process, the master BMS 200 generates a security key for each slave BMS 100. Additionally, the master BMS 200 may share the generated security key with each slave BMS 100.

The security key is for encrypted communication between the master BMS 200 and each slave BMS 100, and the master BMS 200 may map the generated security key onto the slave identification information of each slave BMS 100 and register the security key mapped onto the slave identification information in a device database of the master memory 210. Additionally, each slave BMS 100 may map the security key shared by the master BMS 200 to the master identification information of the master BMS 200 and register the security key mapped onto the master identification information in a device database of its slave memory 110.

Figure 5:
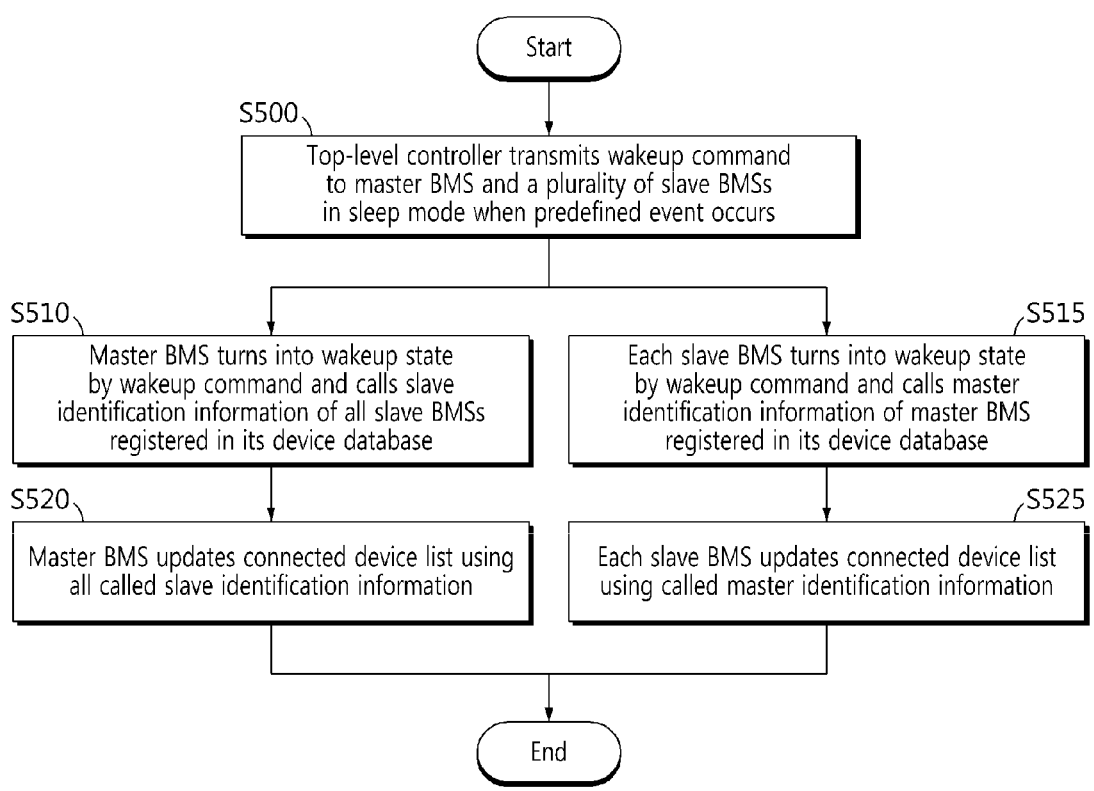
FIG. 5 is a flowchart illustrating a method of establishing a wireless connection for encrypted communication between a master BMS and each slave BMS of a wireless battery management apparatus according to another embodiment of the present disclosure.

FIG. 5 is a flowchart illustrating a method of establishing a wireless connection for encrypted communication between the master BMS and each slave BMS of the wireless battery management apparatus according to another embodiment of the present disclosure.

The method according to FIG. 5 may be performed when the battery pack 10 is mounted in the electric powered apparatus after slave identification information is allocated to each of the plurality of slave BMSs 100-1~100-4 by the method according to FIG. 4.

Referring to FIG. 5, in step S500, when a predefined event occurs, the top-level controller 300 transmits a wakeup command to the master BMS 200 and the plurality of slave BMSs 100-1~100-4 in sleep mode. For example, the event may be an event of ignition ON of the electric powered apparatus on which the battery pack 10 is mounted.

In step S510, the master BMS 200 turns into wakeup state by the wakeup command and calls the slave identification information of all the slave BMSs 100-1~100-4 registered in the device database of the master BMS 200.

In step S520, the master BMS 200 updates a connected device list using all the called slave identification information. The updated connected device list indicates all slave BMSs 100-1~100-4 capable of encrypted communication with the master BMS 200.

In step S515, each slave BMS 100 turns into wakeup state by the wakeup command, and calls the master identification information of the master BMS 200 registered in its device database.

In step S525, each slave BMS 100 updates its connected device list using the called master identification information. The updated connected device list indicates the master BMS 200.

When step S520 and step S525 are all finished, the master BMS 200 and each slave BMS 100 establish a wireless connection for their encrypted communication using their updated connected device lists.

In performing the encrypted communication between the master BMS 200 and each slave BMS 100, the master BMS 200 and each slave BMS 100 may transmit an encrypted data packet to the opposing party, and demodulate the data packet encrypted by the opposing party using the security key pre-stored in them.

The embodiments of the present disclosure described hereinabove are not implemented only through the apparatus and method, and may be implemented through programs that realize the functions corresponding to the configurations of the embodiments of the present disclosure or recording media having the programs recorded thereon, and this implementation may be easily achieved by those skilled in the art from the disclosure of the embodiments previously described.

While the present disclosure has been hereinabove described with regard to a limited number of embodiments and drawings, the present disclosure is not limited thereto and it is obvious to those skilled in the art that various modifications and changes may be made thereto within the technical aspects of the present disclosure and the equivalent scope of the appended claims.

Additionally, many substitutions, modifications and changes may be made to the present disclosure described hereinabove by those skilled in the art without departing from the technical aspects of the present disclosure, and the present disclosure is not limited to the above-described embodiments and the accompanying drawings, and each embodiment may be selectively combined in part or in whole to allow various modifications.

<Description of Reference Numerals >10: battery pack 20: battery module 30: wireless battery management apparatus 100: slave BMS 200: master BMS 300: top-level controller

What is claimed is:

1. A wireless battery management apparatus operably coupled to a top-level controller, comprising:
a master battery management system (BMS) operably coupled to the top-level controller in a wired communication mode; and
a plurality of slave BMSs operably coupled to the master BMS in a wireless communication mode,
wherein the top-level controller is configured to:
transmit an identification information allocation command including a plurality of different slave identification information to the master BMS, and
supply operating power to the plurality of slave BMSs in a sequential order according to a predefined rule,
wherein the master BMS is configured to wirelessly transmit any one slave identification information corresponding to the predefined rule among the plurality of slave identification information to a slave BMS currently in a wakeup state by the operating power when operating in an identification information allocation mode in response to the identification information allocation command, and
wherein each slave BMS is configured to:
establish a wireless connection for unencrypted communication with the master BMS using its pre-allocated temporary address when waking up by the operating power, and
set its wireless address and regular ID using the slave identification information transmitted from the master BMS through the unencrypted communication.

2. The wireless battery management apparatus according to claim 1, wherein each slave identification information includes slave address data and a regular ID for each slave BMS.

3. The wireless battery management apparatus according to claim 2, wherein the regular ID of each slave identification information indicates an electrical location of a battery module to which each slave BMS is coupled among a plurality of battery modules connected in series in a battery pack.

4. The wireless battery management apparatus according to claim 1, wherein the identification information allocation command further includes master identification information for the master BMS.

5. The wireless battery management apparatus according to claim 4, wherein:
the master BMS is further configured to transmit the master identification information to the slave BMS currently in the wakeup state by the operating power; and each slave BMS is further configured to store the master identification information in its slave memory while each slave BMS is in the wakeup state by the operating power.

6. The wireless battery management apparatus according to claim 5, wherein, each time the master BMS transmits the slave identification information to each slave BMS, the master BMS is further configured to transmit a setting completion message to the top-level controller.

7. The wireless battery management apparatus according to claim 6, wherein the top-level controller is further configured to stop supplying the operating power to the slave BMS currently in the wakeup state, when the top-level controller receives the completion message from the master BMS.

8. The wireless battery management apparatus according to claim 7, wherein the top-level controller is further configured to supply the operating power to a next slave BMS according to the predefined rule, when the top-level controller stops supplying the operating power to the slave BMS currently in the wakeup state.

9. The wireless battery management apparatus according to claim 1, wherein the master BMS is further configured to:
   generate a security key for each slave BMS each time the master BMS transmits the slave identification information to each slave BMS; and
   map the security key generated for each slave BMS onto the slave identification information of each slave BMS and register the security key in a device database of the master BMS.

10. The wireless battery management apparatus according to claim 9, wherein:
   the top-level controller is further configured to transmit a wakeup command to the master BMS when a predefined event occurs after the identification information allocation mode ends; and
   the master BMS is further configured to:
      when receiving the wakeup command, update a connected device list using the slave identification information of the plurality of slave BMSs registered in the device database; and
      establish a wireless connection for encrypted communication with each slave BMS using the updated connected device list.

11. The wireless battery management apparatus according to claim 10, wherein the predefined event is an event of ignition ON of an electric powered apparatus in which the wireless battery management apparatus is mounted.

12. A battery pack, comprising:
   the wireless battery management apparatus according to claim 1.

* * * * *